Patented Apr. 5, 1949

2,466,395

UNITED STATES PATENT OFFICE 2,466,395

METHYLENE MALONONITRILE AND VINYL ACETATE COPOLYMER

Joseph B. Dickey, Rochester, N. Y., assignor to Eastman Kodak Company, Rochester, N. Y., a corporation of New Jersey No Drawing. Application November 15, 1945, Serial No. 628,963

2 Claims. (Cl. 260—78.5)

This invention relates to new polymeric materials and more particularly to copolymers of alkylene malononitriles or amides with compounds containing a

group therein.

This invention has for its object the preparation of new copolymers. Another object of this invention is to prepare copolymers of alkylene malono compounds. A further object of this invention is the preparation of copolymers useful for use in coating compositions, molding compositions, and the like. Other objects of this invention will appear herein.

These objects are accomplished by the copolymerization of alkylene malononitriles or amides with unsaturated compounds containing a

group therein. The alkylene malononitriles and amides which are suitable for use as the starting material for preparing copolymers in accordance with our invention have the following structural formula $$M-\overset{N}{\underset{|}{C}}=C\diagup\overset{R}{\underset{R}{\diagdown}}$$

in which N represents hydrogen, aryl, alkylene, alkyl, or heterocyclic groups; M represents hydrogen, alkyl, alkylene, aryl, or heterocyclic or $$-\overset{N}{\underset{|}{C}}=C\diagup\overset{R}{\underset{R}{\diagdown}}$$

groups and R and $R_1$ represent CN or

The alkyl groups which may be employed at the points designated by M and N may be any of the alkyl hydrocarbon groups, particularly alkyl groups of up to five carbon atoms, such as methyl ethyl propyl and butyl. The alkylene groups which may be employed may be ethylene, propylene, or other groups having a high number of carbon atoms, the groups which are suitable being designated by the formula $C_nH_{2n}+2$, all of the valences except one being occupied by additional substituents. These groups may also be considered as substituted alkyl groups. If desired, compounds may be employed in which M or N or both points are satisfied with groups containing a ring structure therein, such as vinyl benzyl, tolyl, tetrahydrofurfuryl, indole, naphthyl, or the like. Some of the monomers of this type which are particularly useful are the following:

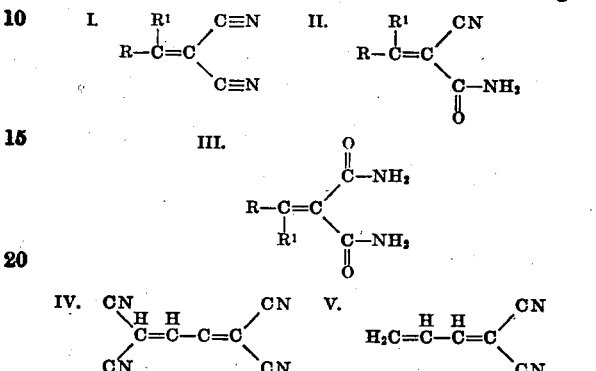

Compounds of the type of the first, fourth and fifth shown above may be prepared by any method shown in the prior art. For example, the method described in Chemiker-Zeitung I, 613 (1921). Compounds so prepared may then be hydrolyzed by means of $H_2SO_4$ or hydrogen peroxide to compounds of the type of II and III or the amides of the compounds designated by Formulas IV and V. This hydrolysis may be carried out in accordance with the procedure of Bull. Sci. acad. roy. Belg., 21, 226 (1935).

The copolymerization of this invention is carried out using as the second component an unsaturated compound containing a

group therein. The various types of compounds which may be used are as follows:

1. Vinyl compounds—vinyl acetate, vinyl butyrate, vinyl chloride, vinyl fluoride, N-ethyl vinyl sulfonamide, vinyl isopropenyl sulfone, methyl vinyl ether, N-vinyl urea, N-vinyl ethyl carbamate, o-vinyl carbamate.

2. Isopropenyl compounds—isopropenyl acetate, methyl isopropenyl ketone.

3. Unsaturated acid compounds—methyl acrylate, methyl methacrylate, methyl crotonate, acrylic acid amide, methyl maleate, di-isopropyl fumarate, α-ethoxy acrylonitrile, α-methoxy ethyl acrylate.

4. Aromatic compounds with unsaturated groups attached thereto—styrene, α-methyl styrene.

5. Vinylidine compounds—vinylidine dichloride, vinylidine difluoride, vinylidine chloride fluoride.

6. Unsaturated hydrocarbon compounds—ethylene, isobutylene, butadiene, 2-chloro-butadiene, 2-cyanobutadiene, 2-acetoxy butadiene, 1-acetoxy butadiene.

The polymerizations in accordance with this invention may be carried out either with or without, a catalyst. If the use of a catalyst is desired, some of the oxygen catalysts which may be employed are oxygen, benzoyl peroxide, acetyl peroxide, tetralin peroxide, or any of the oxygen type catalysts mentioned in the prior art. The copolymerization in accordance with this invention may be carried out by any of the polymerization methods which have been previously taught, such as in mass, in solution in an aqueous suspension, or in the form of small droplets. Among the solvents which may be used are included alcohols, organic acids, amides, aromatic hydrocarbons, esters, and dioxane. In carrying out copolymerization in accordance with this invention, it is ordinarily desirable that the amounts of each of the constituents be approximately the same. This, however, is not essential, particularly if some consideration of one of the monomers is to be emphasized. In accordance with this invention each of the two types of constituents going to make up a copolymerization in accordance with this invention should be present in an amount at least 5 per cent of the total amount of the material used.

The following examples illustrate the preparation of copolymers in accordance with this invention:

*Example 1.*—7.8 g. of methylene malononitrile and 8.6 g. of vinyl acetate were mixed together with 0.015 g. of benzoyl peroxide, sealed in a tube, and heated at 40° C. for two days and then for several hours at 70° C. The resulting product was removed from the tube, dissolved in acetic acid and the solution was poured into water to separate the polymer obtained from the monomers present therein. A slightly yellowish polymer was obtained. Instead of vinyl acetate, vinyl butyrate, vinyl furoate, isopropenyl acetate or isopropenyl propionate may be employed in this procedure.

*Example 2.*—A mixture of 7.8 g. of methylene malononitrile, 17.2 g. of methyl acrylate, and 0.03 g. of benzoyl peroxide were mixed together and polymerized as described in the preceding example. The polymer obtained was purified by dissolving the mass in acetone and precipitating in water. The resulting product was a white solid. This polymer was suitable for dissolving in acetone and spinning into fibers.

*Example 3.*—A mixture was prepared of 8 g. of methylene malononitrile, 17 g. of butadiene, 0.5 g. of urea peroxide, 55 cc. water, 0.9 g. gelatin, 0.05 g. 2-ethylhexanol, 0.07 g. of carbon tetrachloride, and 0.2 g. of sodium alkyl naphthalene sulfonate, known in the trade as Nekal A, were mixed together and an emulsion thereof was formed. This mass was held at 50-60° C. until the polymerization had gone as far as desired.

Acid was then added to the mass to break the emulsion and a yellowish elastic solid polymer was obtained which could be vulcanized. In this reaction or in that of the preceding example any of the following compounds might be substituted for the methylene malononitrile:

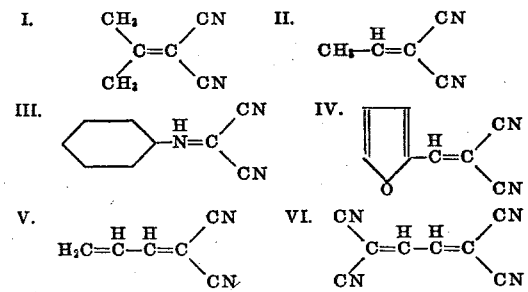

*Example 4.*—A mixture was prepared as in Example 3 using 8 g. methylene malononitrile and 36 g. of 2-chlorobutadiene-1,3. The polymerization was carried out as described in Example 3. A yellowish polymer was obtained which was tough and elastic and was capable of being vulcanized. Instead of 2-chloro-butadiene-1,3 there may be employed in this example any of the following: 1-chlorobutadiene-1,3, isoprene, 2,3-dimethyl-butadiene-1,3, 2-cyanobutadiene-1,3, 1-cyano-butadiene - 1,3, 2-cyano-3-methyl-butadiene-1,3 1-acetoxy butadiene-1,3, 2-acetoxy butadiene-1,3, 1-furyl butadiene-1,3, 1-propoxy butadiene-1,3, or 2-butoxy butadiene-1,3.

*Example 5.*—10 g. of α-cyano acrylic acid amide were mixed with 50 g. of styrene and 0.05 g. of benzoyl peroxide and the mixture was heated in a sealed tube at 55° C. until polymerization occurred. The resin obtained was a nearly colorless solid which could be dissolved in solvents, such as acetone, dioxane, acetic acid, formamide, or the like from which valuable fibers could be spun. In this example instead of α-cyano acrylic acid amide any of the following compounds may be employed:

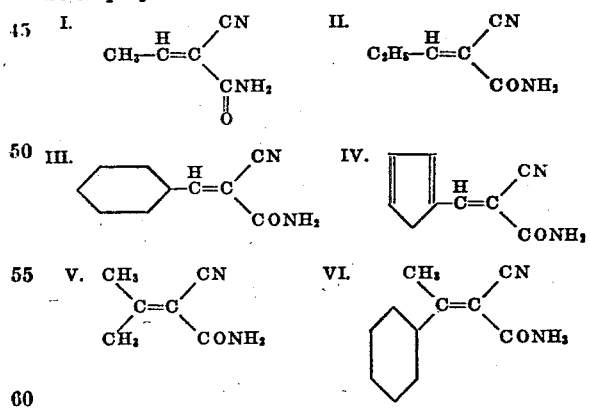

Instead of styrene there may be used α-methyl styrene, α-furyl ethylene or α-pyridyl ethylene.

*Example 6.*—A mixture of 17 g. of β-phenyl-α-cyano acrylic acid amide, 42 g. of vinyl methyl ketone and 0.06 g. of benzoyl peroxide were polymerized for several days at 40° C. The temperature was raised at 60° C. and held at that point for a day and then warmed at 80° C. for a short time. The resulting colorless resin was tough and could be molded or could be spun into fibers.

*Example 7.*—A mixture of 19 g. of methylene malonamide, 100 g. of di-isopropyl fumarate and 0.2 g. of benzoyl peroxide were dissolved in acetic acid and were polymerized beginning the polymerization at room temperature. The temperature was slightly raised to 50° C. and the polymerization was completed at that temperature. The product was colorless, hard, and tough.

Example 8.—5 g. of methylene malonamide, 100 g. of di-isopropyl fumarate, 50 g. of vinylidine dichloride, 0.3 g. of benzoyl peroxide, 500 cc. of water and 1.25 g. of gum arabic were mixed together and placed in a bottle with about 10% free space and tumbled at 50 R. P. M. at a temperature of approximately 50° C. This operation was continued until the polymerization was complete and the monomer was removed therefrom in the form of beads. A tough, colorless polymer was obtained which had good molding properties. In place of vinylidine dichloride, there may be used in this example vinylidine difluoride, vinylidine chloride fluoride, β-phenyl vinylidine dichloride, or vinyl methyl sulfone.

Example 9.—A mixture was prepared of 5.3 g. of acrylonitrile, 8.6 g. of methyl acrylate, and 1 g. of methylene malononitrile, and this mixture was polymerized by the method described in Example 1 using benzoyl peroxide as the catalyst. The polymer obtained was suitable for use for making fibers. Any of the following solvents were solvents for this resin: acetone, methyl ethyl ketone, formic acid, acetic acid, liquid ammonia, formamide, phenol, cresol, or β-hydroxypropionitrile.

Example 10.—A mixture of 7 g. of α-methacrylonitrile, 10 g. of methyl methacrylate, 6 g. of vinyl chloride, 5 g. of vinyl acetate, and 5 g. of α-cyanoacrylic acid amide were polymerized by the method described in Example 1 using benzoyl peroxide as the catalyst. A colorless resin was obtained valuable for the production of molded materials, fibers, or the like.

Example 11.—10.4 g. of 1,1-dicyanobutadiene-1,3 and 17 g. of butadiene were mixed together and polymerized at 40-50° C. using ultraviolet light to promote the polymerization reaction. The resulting polymer was yellowish in color, tough, and elastic and could be vulcanized.

Example 12.—A mixture of 10 g. of 1,1-dicyano-2-methyl butadiene-1,3 and 50 g. of styrene were emulsion polymerized following the method described in Example 5. The resulting polymer was tough and elastic, was susceptible of vulcanization, and was useful for a variety of purposes, such as films, water-proofing textiles, and the like.

Example 13.—A mixture of 15 g. of 1,1-dicyano-4,4-dicyanobutadiene-1,3 and 17 g. of butadiene were polymerized at 40-50° C. using light to activate the polymerization process. A tough, yellowish, elastic polymer was obtained which could be vulcanized.

Example 14.—A mixture of 15 g. of 1,1-dicyano-4,4-dicyanobutadiene-1,3 and 50 g. of styrene were emulsion polymerized by the method described in Example 5. A tough, yellowish, elastic polymer capable of vulcanization was obtained.

Example 15.—15 g. of 1,1-dicyano-4-cyano-4-carboxyamido-butadiene-1,3, 15 g. of N-vinyl ethyl urethane, 20 g. of isopropenyl acetate, and 20 g. of methyl methacrylate were dissolved in phenol and the resulting solution was polymerized at 50° C. using ultra-violet light. The polymer was obtained by pouring the phenolic mass into water, the polymer thereby precipitating. A product was obtained which was tough and yellowish and capable of molding.

Example 16.—5 g. of methylene malononitrile were placed in a 100-cc. autoclave and ethylene was pumped in until a pressure of 25,000 pounds was reached. The system was then heated to a temperature of approximately 180° C. for twenty-four hours. A tough polymer having the general formula

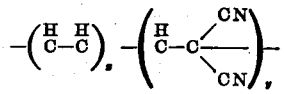

was obtained.

Example 17.—A mixture of 5 g. of α-cyano acrylic acid amide, 5 g. of isopropenyl acetate and 5 g. of di-isopropyl fumarate were placed in an autoclave and ethylene was pumped in, and a polymerization was carried out as described in the preceding example. A slightly yellow polymer suitable for the production of fibers was obtained.

Example 18.—A mixture of 1 g. of methylene malonamide, 10 g. of styrene, and 1 g. of vinyl fluoride were placed in an autoclave and polymerized as in Example 16. A slightly yellowish tough polymer suitable for the preparation of fibers or films was obtained.

Example 19.—2 g. of 1,1-dicyanobutadiene-1,3 were placed in an autoclave with 20 g. of isobutylene and the polymerization was carried out as described in the preceding example. An elastic polymer was obtained.

Example 20.—10 g. of β-methyl methylene malononitrile were mixed with 20 g. of 1-acetoxy butadiene-1,3, and the polymerization was carried out as described in Example 1. A tough slightly yellowish resin was obtained.

Polymers in accordance with my invention can in general be dissolved in organic solvents and employed for preparing filaments or films. For filaments the polymers are dissolved in acetone or some other solvent and extruded through a spinneret into an evaporative atmosphere to remove the solvent therefrom. For the formation of film the polymer is dissolved in a volatile solvent and coated out onto a film-forming surface under evaporative conditions so as to remove the solvent from the sheet. If desired, in preparing polymer sheets of this invention other materials may be incorporated, particularly those which are adapted to plasticize or soften the sheet.

I claim:

1. The polymer resulting from the polymerization of a mixture consisting of methylene malononitrile and vinyl acetate, each being present in an amount of at least 5% of the total amount of material used.

2. A process for preparing a polymer which consists in heating together a mixture of methylene malononitrile and vinyl acetate whereby a copolymer of the methylene malononitrile and vinyl acetate is obtained, the methylene malononitrile and vinyl acetate being present in their mixture in an amount of at least 5% of the total amount of material used.

JOSEPH B. DICKEY.

REFERENCES CITED

The following references are of record in the file of this patent:

UNITED STATES PATENTS

| Number | Name | Date |
| --- | --- | --- |
| 2,396,785 | Hanford | Mar. 19, 1946 |

Certificate of Correction

Patent No. 2,466,395.  April 5, 1949.

JOSEPH B. DICKEY

It is hereby certified that errors appear in the printed specification of the above numbered patent requiring correction as follows:

Column 1, line 40, for that portion of the formula reading $-C=NH_2$ read $-O-NH_2$ column 4, Example 3, Formula III, for $-\overset{H}{N}=C$ read $-\overset{H}{C}=C$ same column, line 67, Example 6, for the word "at", first occurrence, read *to*; and that the said Letters Patent should be read with these corrections therein that the same may conform to the record of the case in the Patent Office.

Signed and sealed this 18th day of October, A.D. 1949.

[SEAL]

THOMAS F. MURPHY,
*Assistant Commissioner of Patents.*